US006033309A

United States Patent [19]
Couch et al.

[11] Patent Number: 6,033,309
[45] Date of Patent: Mar. 7, 2000

[54] PERIPHERAL INPUT DEVICE WITH SIX-AXIS CAPABILITY

[75] Inventors: Johnny D. Couch, Redwood City; James L. Huether, Cupertino, both of Calif.

[73] Assignee: Sega Enterprises, Ltd., Tokyo, Japan

[21] Appl. No.: 08/659,030

[22] Filed: May 31, 1996

Related U.S. Application Data

[63] Continuation-in-part of application No. 08/454,609, May 31, 1995, Pat. No. 5,749,577.

[51] Int. Cl.[7] .......................................................... A63F 9/00
[52] U.S. Cl. .......................................... 463/38; 273/148 B
[58] Field of Search .......................... 273/148 B; 463/37, 463/38

[56] References Cited

U.S. PATENT DOCUMENTS

| | | | |
|---|---|---|---|
| 4,588,187 | 5/1986 | Dell | 273/148 B X |
| 4,706,006 | 11/1987 | Solomon . | |
| 4,935,728 | 6/1990 | Kley . | |
| 5,749,577 | 5/1998 | Couch et al. | 273/148 B |
| 5,786,807 | 7/1998 | Couch et al. | 273/148 B |

FOREIGN PATENT DOCUMENTS

| | | |
|---|---|---|
| 0295368 | of 0000 | European Pat. Off. . |
| 0556936 | of 0000 | European Pat. Off. . |
| 3816488 | 11/1989 | Germany . |
| 9619795 | of 0000 | WIPO . |
| 8805942 | 2/1988 | WIPO . |

OTHER PUBLICATIONS

"Joystick Control of a Robot", IBM Technical Disclosure Bulletin, vol. 29, No. 10, Mar. 1987.

*Primary Examiner*—William H. Grieb
*Attorney, Agent, or Firm*—Price Gess & Ubell

[57] ABSTRACT

A control pad with two input ports for establishing a connection with two three-axis input devices permits six-axis game play. The control pad contains a microprocessor which determines whether one or two three-axis input devices are connected thereto and generates an address signal for communication with a game console to inform a microprocessor of the game console on power up of an exact nature of peripheral input devices which are attached. A thumb-operated rotor assembly is fitted to a top of a joystick for z-axis control and thus allows single-handed three-axis control of computer games through the joystick.

14 Claims, 18 Drawing Sheets

FIG. 5A TRIGGER
FIG. 5B ID2 < ID3
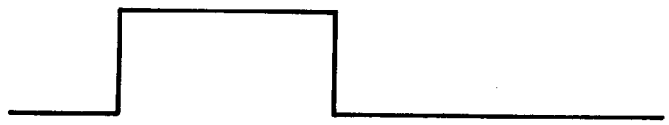
FIG. 5C ID2 = ID3
FIG. 5D ID2 > ID3
→ TIME

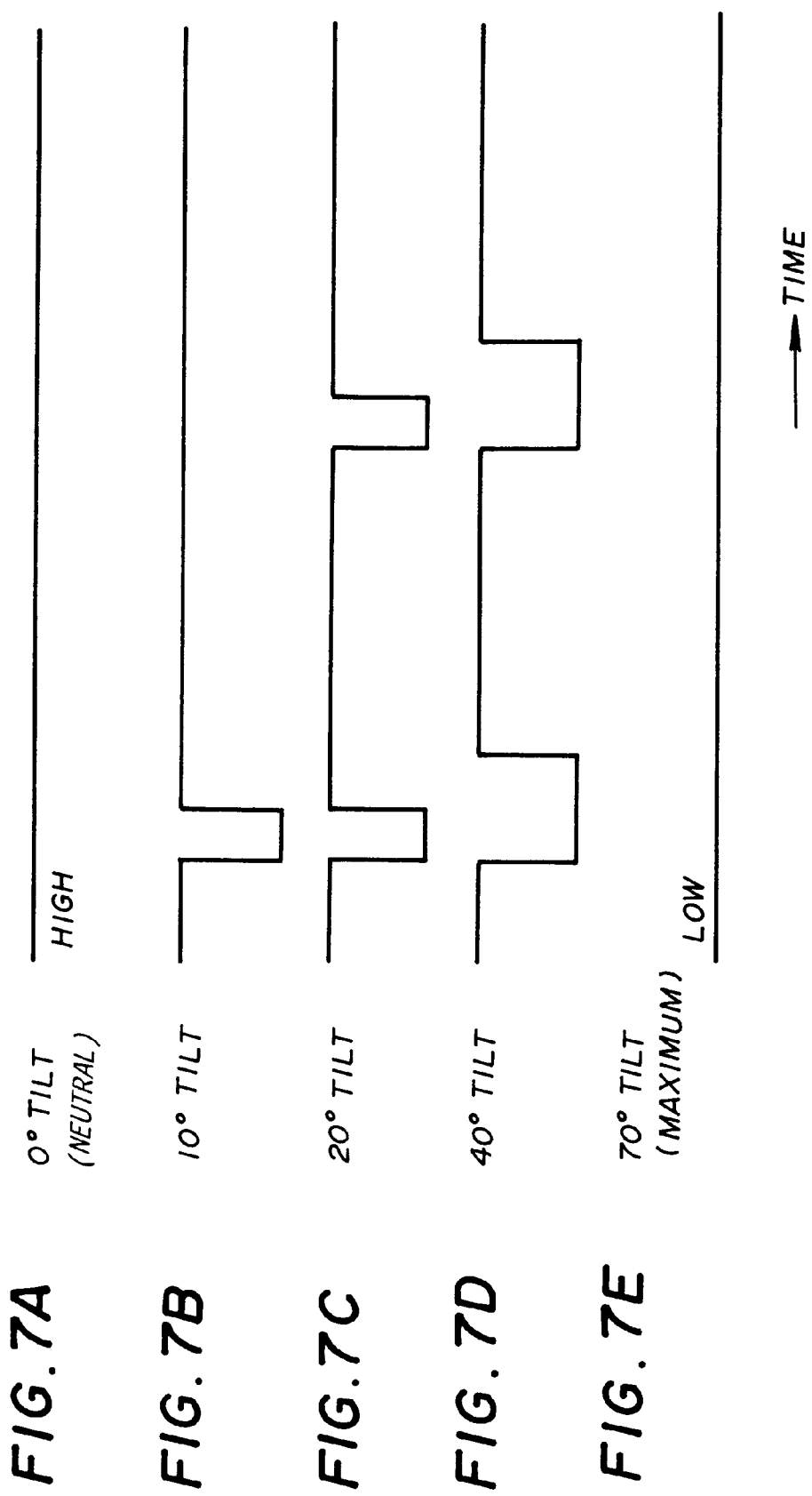

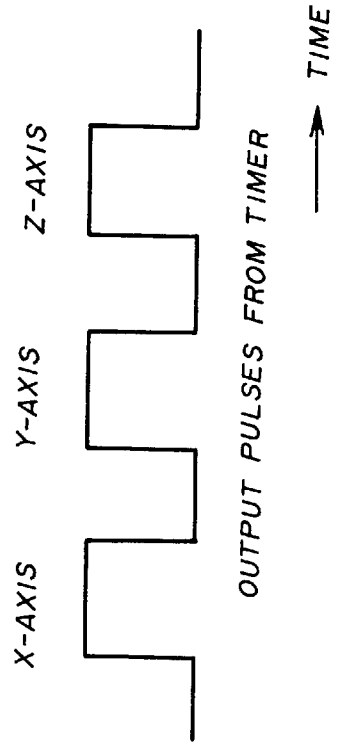
FIG. 8A
FIG. 8B
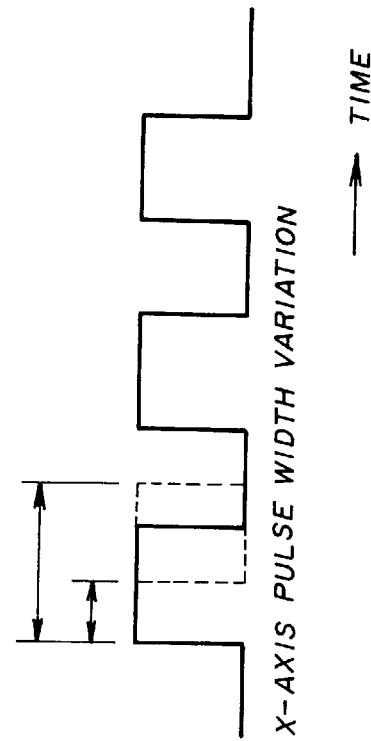
FIG. 9A
FIG. 9B

FIG. 13

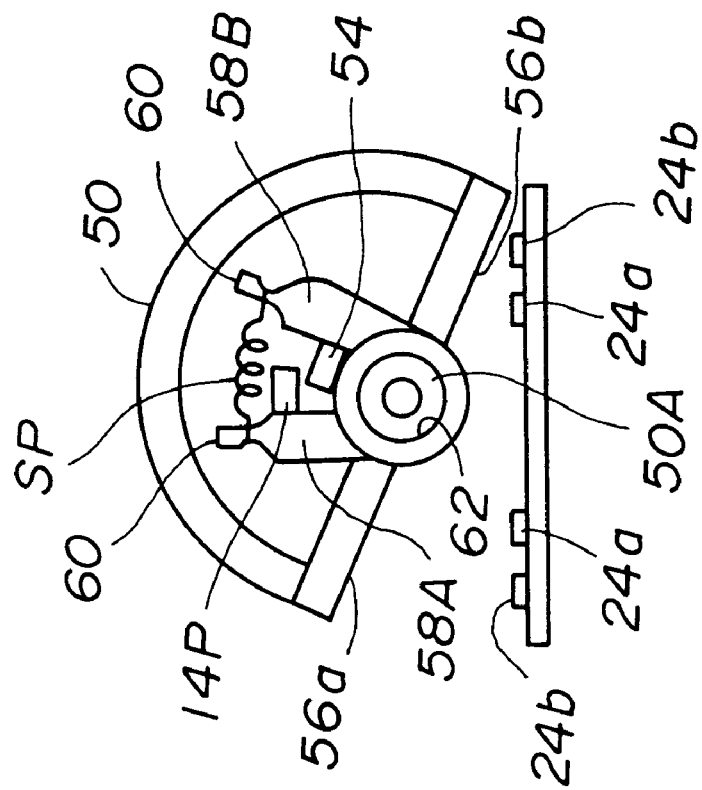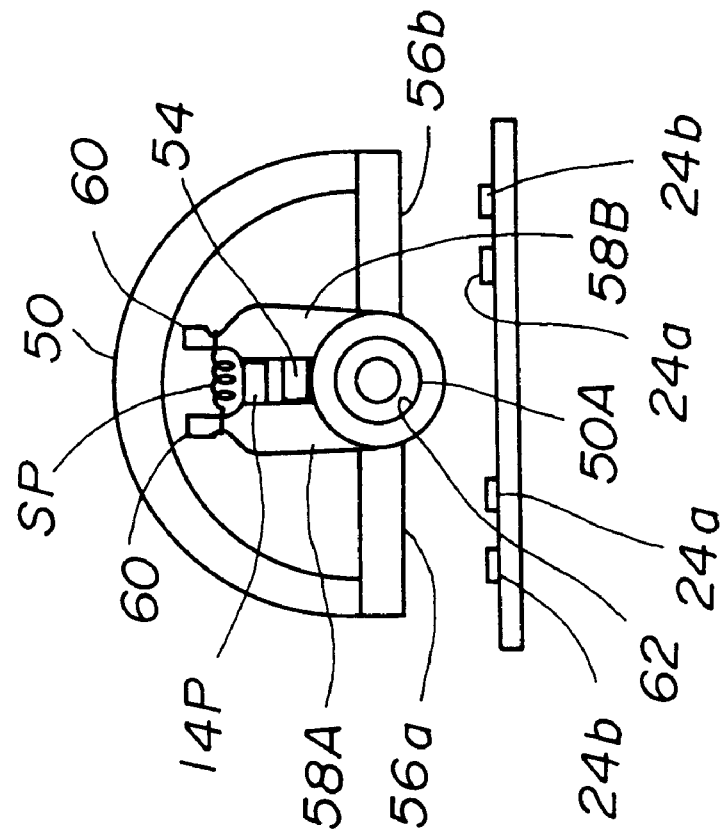

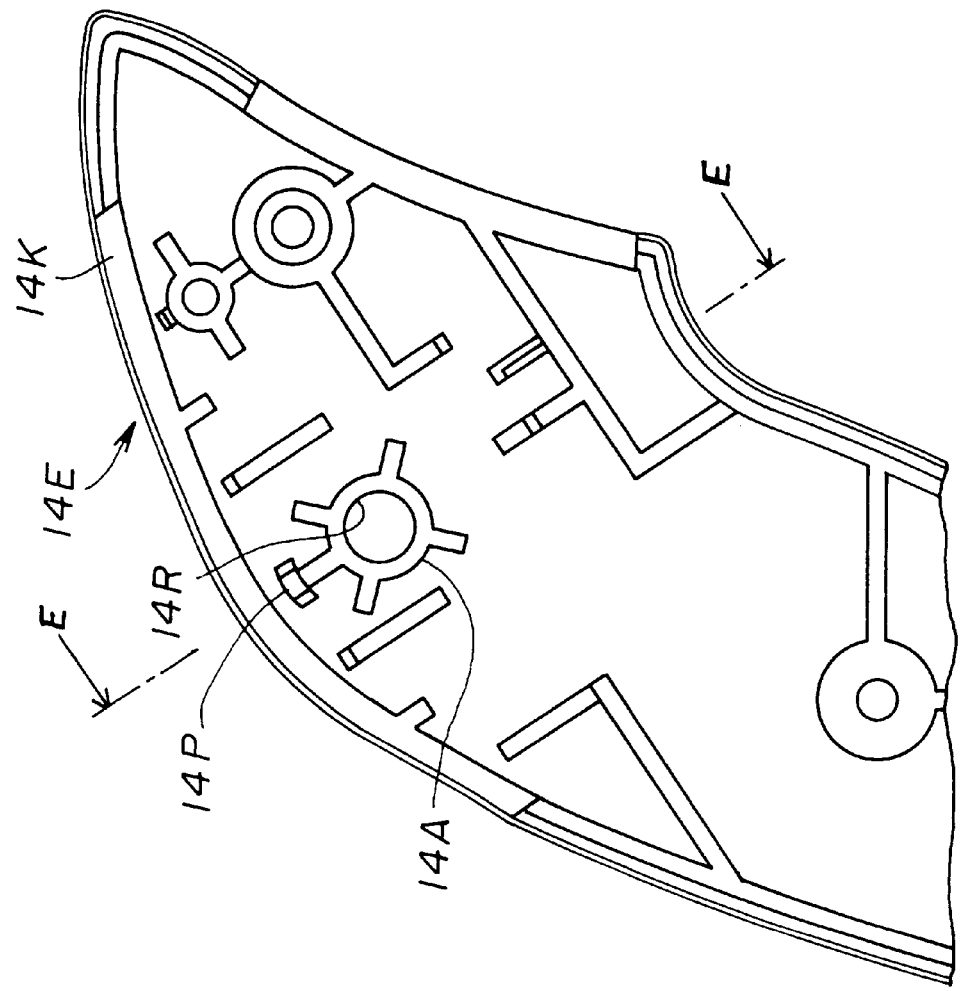
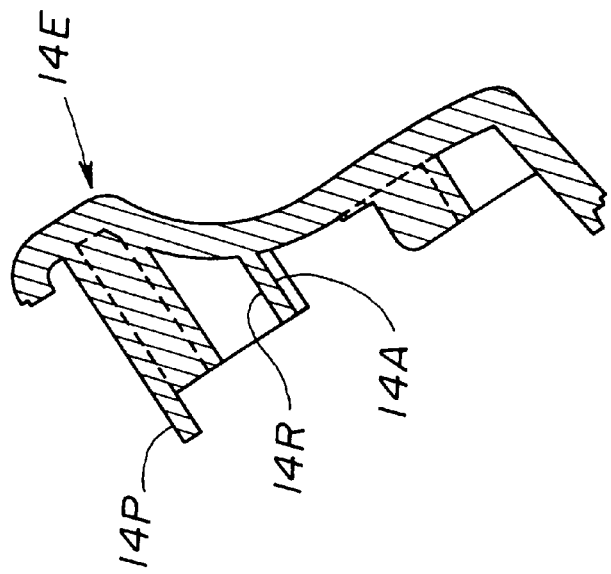

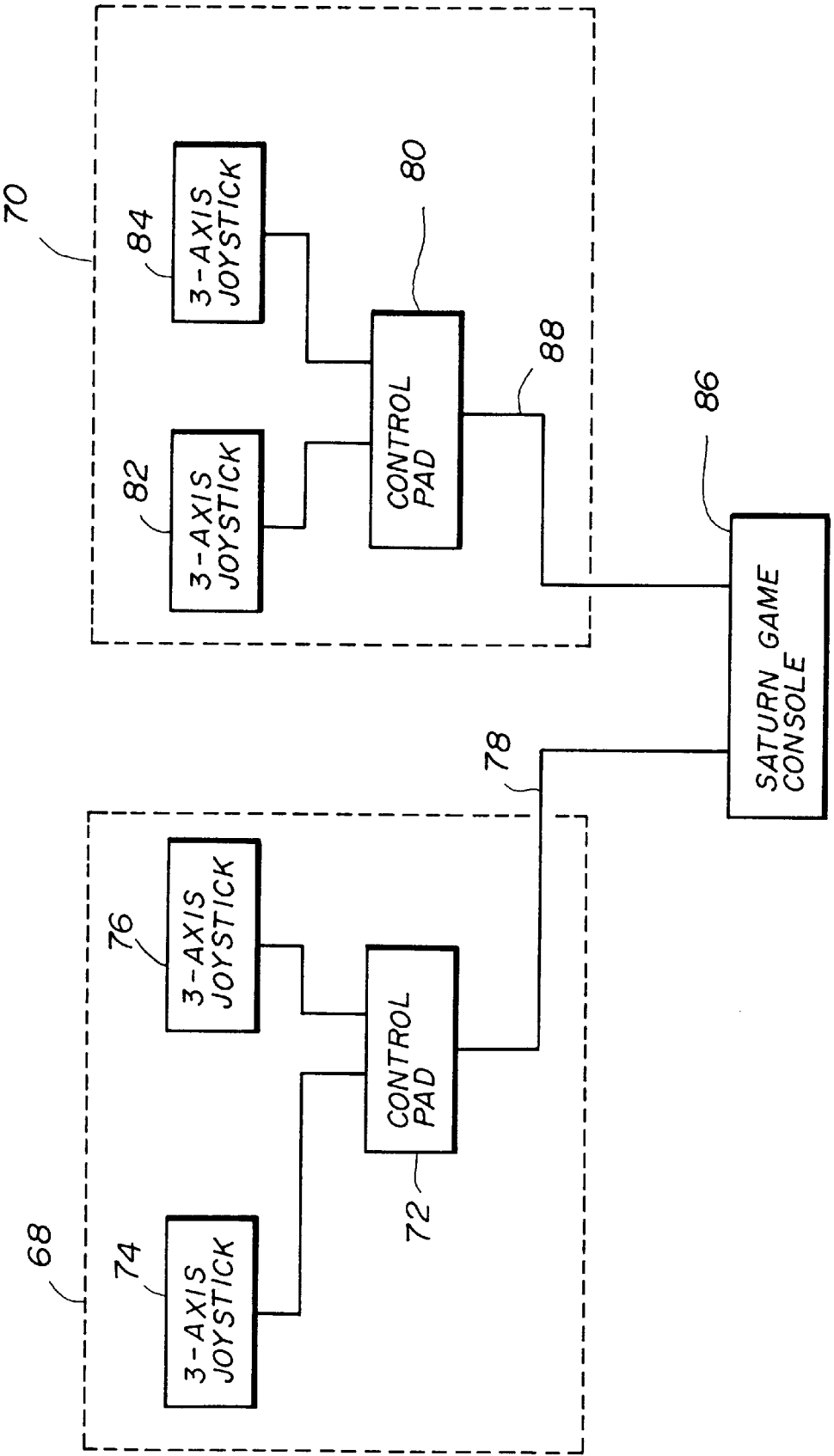

PERIPHERAL INPUT DEVICE WITH SIX-AXIS CAPABILITY

This is a continuation-in-part application of U.S. Ser. No. 08/454,609, filed on May 31, 1995, now U.S. Pat. No. 5,749,577.

BACKGROUND OF THE INVENTION

1. Field of the Invention

The present invention relates generally to peripheral input devices for use with computer-based systems, and, more specifically, to an ability to easily convert use of a system from three-axis to six-axis control, using a control pad with a microprocessor on a board.

2. Related Application Data

The following related applications contain subject matter in common with the present application, and with the exception of the first utility application, the present application is intended to be a continuation in part of these prior applications.

U.S. Utility Patent Application entitled A METHOD FOR SORTING POLYGON DATA AND A VIDEO GAME MACHINE EMPLOYING THE SAME, Application Ser. No. 08/394,838 filed Feb. 27, 1995, claiming priority from Japanese Application No. 56723/94, Mar. 1, 1994.

U.S. Design Patent Application entitled CONTROL PAD, application Ser. No. 29/036,218, filed Mar. 15, 1995.

U.S. Design Patent Application entitled CONTROL PAD WITH CONTROL STICK, application Ser. No. 29/036,221, filed Mar. 15, 1995.

U.S. Design Patent Application entitled CONTROL PAD WITH CONTROL STICK, application Ser. No. 29/036,205, filed Mar. 15, 1995.

U.S. Design Patent Application entitled CONTROL STICK AND BASE, application Ser. No. 29/036,220, filed Mar. 15, 1995.

U.S. Design Patent Application entitled CONTROL PAD WITH DUAL CONTROL STICK, application Ser. No. 29/036,219, filed Mar. 15, 1995.

There is also a related utility patent application entitled A PERIPHERAL INPUT DEVICE WITH SIX-AXIS CAPABILITY, Ser. No. 08/454,609, filed on May 31, 1995; and now U.S. Pat. No. 5,749,577; and a related utility patent application entitled A CONVERTIBLE PERIPHERAL INPUT DEVICE, Ser. No. 08/455,055, filed on May 31, 1995.

3. Description of the Related Art

The growth of computer games, played on both personal computers and on raster-based game consoles for use with television/video output, has led to an increased need for peripheral input devices which can enable and actuate the movement of objects in the game space. As the computer games and operating systems on which they are played have become richer in their data format and their data processing capabilities, play and control using additional axes has become desirable.

SUMMARY OF THE INVENTION

True three-axis control using a single hand is achieved according to the present invention.

Moreover, an ability to obtain a six-axis controller is achieved by using two three-axis input devices ported through a control pad. The control pad includes microprocessor on board which can communicate with a main operating system regarding whether the game will be played using three axes with a single input device attached to the control pad or whether play will use six axes because there are two input devices attached to the control pad.

According to one embodiment of the present invention, a true three-axis input device, with a high-resolution analog response (as well as the capability for digital output), is provided by using a joystick which has a single swivel point at the base of the joystick. The joystick is mounted on a planar surface which has a reflective surface on the side opposite of the joystick. The joystick and its mount are positioned substantially parallel to and adjacent to a sensing plane in which the position and motion of the joystick are determined by optical motion detectors (sensors) mounted on the sensing plane. The sensors emit and detect optical signals and based upon the reflected signals determine the position and motion of the joystick. The x-axis and y-axis motions of the joystick control two axes of game play. The third axis is controlled by a thumb-operated rotor which also employs optical motion detection sensors to output z-axis position data signals.

According to another embodiment of the present invention, a peripheral input device is convertible from three-axis play to six-axis play by attachment of a second three-axis input device to a control pad which includes two input ports and a microprocessor on board. on power up, the microprocessor determines whether one or two three-axis input devices are connected to the control pad. If one three-axis input device is connected to the control pad, then the control pad microprocessor outputs one address signal, or a particular ID code indicative of that configuration of the peripheral device. If two three-axis input devices are connected to the control pad, then a different address signal is output which is indicative of this configuration. Thus, the game console (or personal computer) microprocessor can determine which peripheral output device is attached by accessing registers in the game console which store the input device ID code.

Other objects and further features of the present invention will become more apparent from the following detailed description when read in conjunction with the accompanying drawings.

BRIEF DESCRIPTION OF THE DRAWINGS

FIGS. 5A, 5B, 5C and 5D show time charts for illustrating an operation of the circuit shown in FIG. 4;

FIGS. 7A, 7B, 7C, 7D and 7E show time charts for illustrating an operation of the circuit shown in FIG. 6;

FIGS. 8A and 8B show output pulses corresponding to the joystick shown in FIGS. 1A, 1B and 1C in a neutral-position state in the peripheral input device in the embodiment of the present invention;

FIGS. 9A and 9B show a variation of the output pulses corresponding to left and right direction (x-axis direction) tilt of the joystick shown in FIG. 1 in the peripheral input device in the embodiment of the present invention;

FIG. 13 shows a circuit diagram of an electric circuit contained in a joystick base assembly of the joystick in the peripheral input device in the embodiment of the present invention;

FIGS. 17A and 17B illustrate an operation of a spring-loaded return mechanism of the thumb-operated z-axis rotor assembly applied to the peripheral input device in the embodiment of the present invention;

FIGS. 18A and 18B show an internal side elevational view of a housing of the elongated member and an E—E line cross-sectional view thereof, respectively;

FIG. 21 shows a block diagram indicating the peripheral input devices, in the embodiment of the present invention, each including the control pad and three-axis joysticks.

DETAILED DESCRIPTION OF THE PREFERRED EMBODIMENTS

The above-mentioned utility patent application entitled A PERIPHERAL INPUT DEVICE WITH SIX-AXIS CAPABILITY, Ser. No. 08/454,609, filed on May 31, 1995 is incorporated herein by reference.

In the following detailed description of the preferred embodiments, the term 'computer games' is used to include traditional videogames (or video games) which use a game console, personal computer based games which are operated through the personal computer CPU and mainframe computers programmed to provide game play. Throughout this description, the term 'peripheral input device' is intended to include joystick controllers, mouse controllers, track balls and other multi-axis input devices, as well as combinations thereof.

The present invention is described below with respect to particularly preferred embodiments as implemented on the Sega Saturn™ Videogame Platform (Game Console) with the Mission Stick input device. This description is intended to be illustrative of the present invention and is not intended to limit the claims which are attached below. Those of ordinary skill in the art will appreciate that modifications and substitutions may be made to the devices described below without departing from the spirit of the present invention nor the claims attached below. In order to better organize the description, it is broken up into three different sections: A. the Three-Axis Joystick; B. the Z-Axis Rotor Assembly which provides for one-handed operation of the three-axis joystick; and, C. the Peripheral Input Device which comprises a combination of a control pad with a microprocessor and one or two three-axis input devices to permit six-axis game play.

A. Single Hand, Three-Axis Joystick with Analog or Digital Output Signals

Figure 1A:
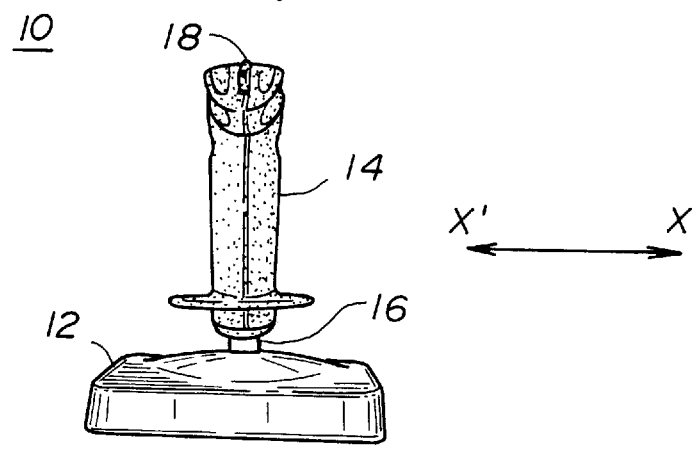
FIGS. 1A, 1B and 1C show a front view, a plan view and a left-side elevational view of a three-axis joystick in one embodiment of a peripheral input device according to the present invention, respectively.
Figure 1B:
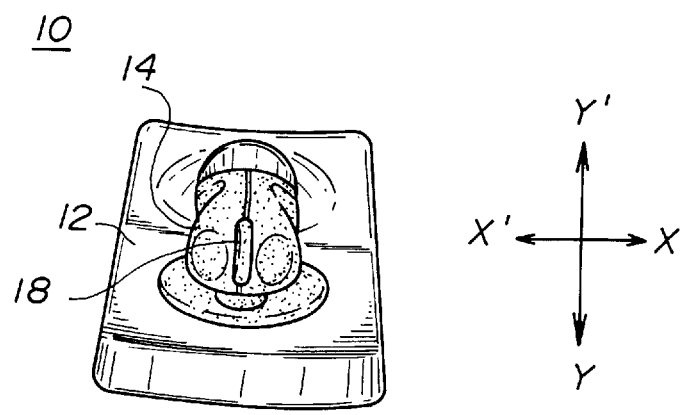
Figure 1C:
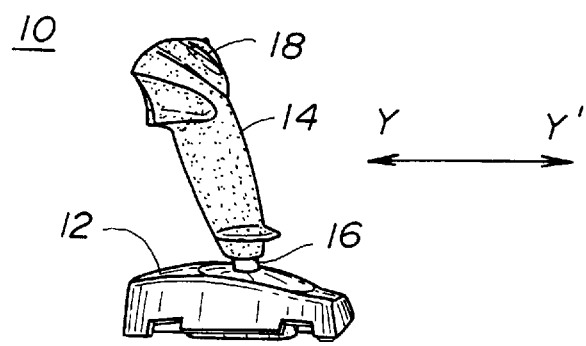

The present invention enables a player to have three-axis control with a single hand because controls for each axis are found on a single joystick. Referring now to FIGS. 1A, 1B and 1C, the joystick 10 has a joystick base assembly 12 and an elongated member 14. Movement of the elongated member 14 in the x-y direction generates data corresponding to x-y position data. A spring tensioner 16 returns the elongated member 14 to a center (neutral) position when forces applied to the elongated member 14 by the user are relieved. The third axis, the z-axis, is controlled by a thumb-operated rotor assembly 18 located at the top of the elongated member 14. The rotation of the rotor about a center (neutral) position provides data about z-axis position. A spring mechanism also returns this rotor to the neutral position when a force applied to the rotor by the user is relieved.

Figure 2:
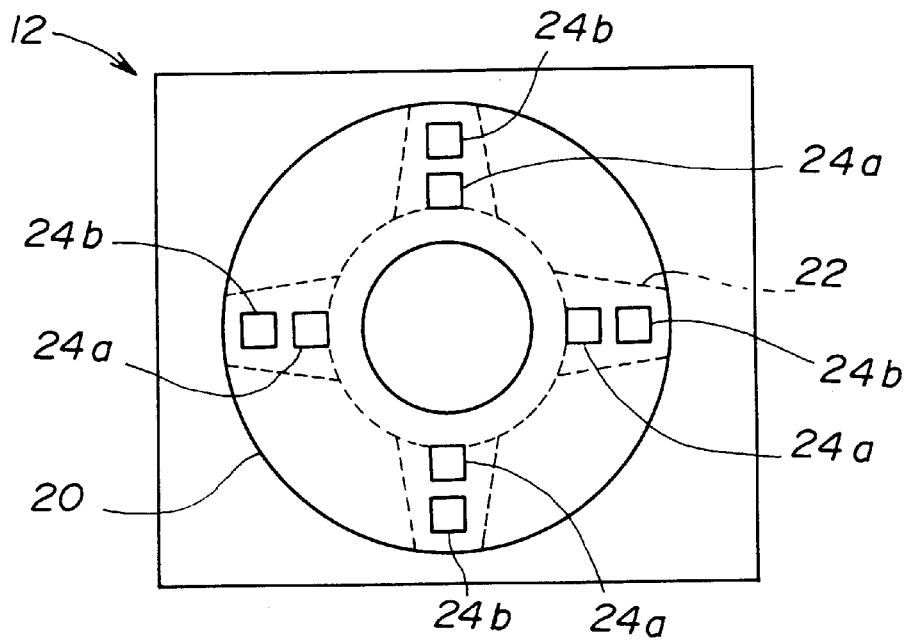
FIG. 2 shows a plan view of a sensor base and a joystick base of the three-axis joystick shown in FIGS. 1A, 1B and 1C.
Figure 3:
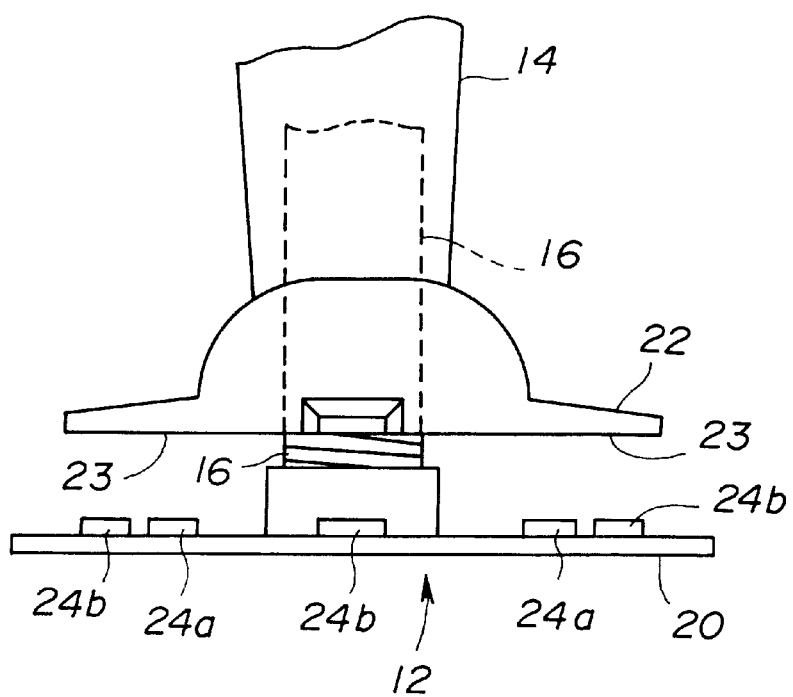
FIG. 3 shows a partial side elevation view of the joystick base, a sensor surface and a joystick member (elongated member) of the joystick shown in FIGS. 1A, 1B and 1C.

According to a particularly preferred embodiment of the joystick, the joystick 10 is mounted on the base assembly using an elongated coil spring 16, similar to the type of coil spring used in a door stop. The coil spring 16 is inserted into the elongated joystick member 14. The coil spring 16 is at one end mounted on the joystick base assembly 12, through a sensor base 20 (substrate). At the bottom the elongated joystick member 14, there is a joystick base 22 in the shape of a cross as shown in FIG. 2. While this is representative of the preferred embodiment, other shapes would achieve the same result functioning in substantially the same way. The characteristics of the joystick base 22 are that it must allow the elongated member 14 to deflect along the x-axis and the y-axis and it must have a flat reflective surface 23 which moves in relation to the x-axis and y-axis deflection of the elongated member 14. The coil spring 16 is connected to the joystick base 22, and then passes through it into the elongated member 14 as shown in FIG. 3. X-axis and y-axis positional data is obtained from the joystick 10 because the sensor base 20 has infrared LEDs 24a and photodiodes 24b mounted thereon at positions corresponding to the shape of the joystick base 22 as shown in FIGS. 2 and 3. Because the bottom surface of the joystick base 22 has the reflective surface 23 thereon, the photodiodes 24b detect the amount of the reflected light and can therefore determine the magnitude of deflection of the joystick base 22. By FIG. 3, it is possible to understand how the LEDs 24a (emitters) and photodiodes 24b (detectors) are used for obtaining joystick position data. When the elongated joystick member 14 is in the center (neutral) position, distances of emitted, then reflected light between all pairs of the LEDs 24a and photodiodes 24b are equal to each other. Accordingly, all the photodiodes 24b receive equal amounts of reflected light therebetween. When the elongated member 14 tilts due to a force of the user applied thereto and thereby the joystick base 22 also tilts accordingly, the distances of light traveling between the pairs of the LEDs 24a and photodiodes 24b are different from one another. As a result, the amounts of the reflected light detected by the photodiodes 24b are different from one another. Each photodiode 24b generates an electric current directly in proportion to the amount of incident light.

Figure 4:
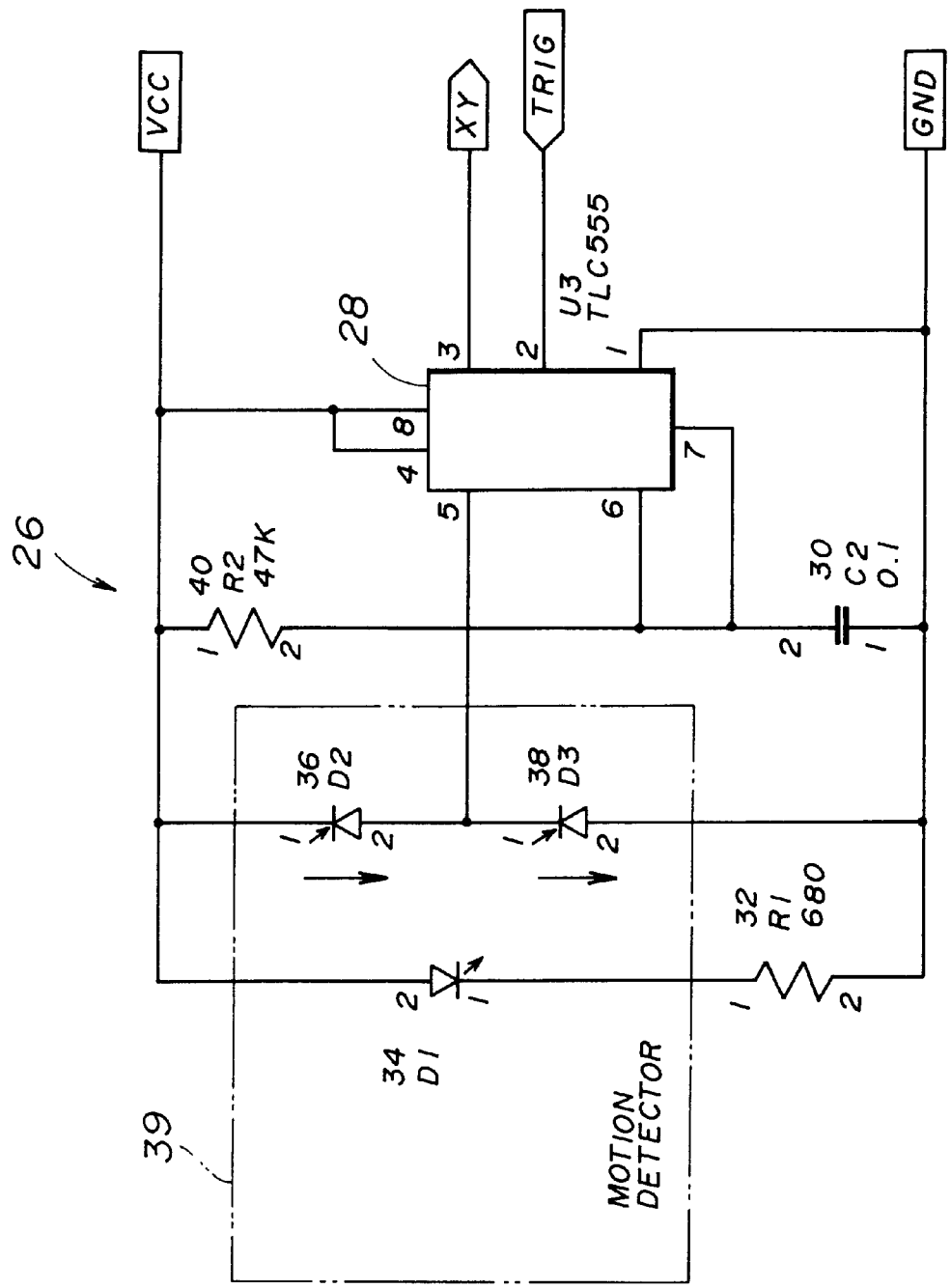
FIG. 4 shows a circuit diagram of one example of a motion detection circuit which can be applied to the peripheral input device in the embodiment of the present invention.

An example of a motion detection circuit 26 is shown in FIG. 4. An electric current obtained from each of photodiodes 36, 38 (corresponding to the photodiodes 24b shown in FIGS. 2 and 3) is digitized through a pulse width modulator. In the example shown in FIG. 4, the photodiodes 36, 38 are connected to a CMOS 555 timer chip 28 which then generates a pulse-width-modulated (PWM) waveform. This waveform is input to the game console. The CMOS timer 28 is formed of a monostable multivibrator (one shot). Initially, an x-y output through a pin 3 of the timer 28 is at a low level. As a result of a short, active-low-level trigger pulse (shown in FIG. 5A) being supplied to the timer 28 through a pin 2, a capacitor 30 is charged via a resistor 40. Thereby a level of the above-mentioned output increases and maintains a high level. When the voltage appearing across the capacitor 30 reaches two thirds of VCC, the capacitor 30 is discharged via a pin 7 of the timer 28, and thus the above-mentioned output returns to a low-level state.

A resistor 32 shown in FIG. 4 is used for setting an illumination level of an infrared LED 34 (corresponding to the LEDs 24a shown in FIGS. 2 and 3) which illuminates the reflective surface 23 of the joystick base 22. It is also possible to use wavelengths other than the infrared wavelength for the same purpose. An infrared light reflected by the reflective surface 23 of the joystick base 22 illuminates the photodiodes 36, 38. A motion detector 39 (the electric circuit contained in the joystick 10) is connected to the timer 28 and thus an electric current from the photodiode 36 is supplied to a control input (pin 5) of the timer 28. The photodiode 38 draws out an electric current from this control input of the timer 28. The pin 5 is connected to a resistor voltage divider inside the timer 28 and, by the resistor voltage divider, the two electric currents of the photodiodes 36, 38 are converted into a control voltage. As a result, a pulse width of the x-y output of the PWM is directly in proportion to a ratio (rather than a difference) between the amounts of light incident to the two photodiodes 36, 38. In this circuit, without providing a voltage reference, a voltage regulator or a large-capacitance filter capacitor, power source voltage independence and superior noise immunity capability are provided. Thereby, the above-mentioned ratio relationship is critical.

When the two photodiodes 36, 38 have equal illuminations incident thereon (reflected by the joystick base 22 in the neutral position), the photodiode 38 draws out an amount of the electric current precisely the same as an amount of the electric current the photodiode 36 supplies. Accordingly, the net zero electric current is supplied to the control pin 5 of the timer 28. As a result, the PWM waveform is not influenced and thus maintains a center (or middle) pulse width (shown in FIG. 5C) defined by the capacitor 30 and a resistor 32. When any unbalance occurs between the reflected light amounts received by the two photodiodes 36, 38, that is, when the reflected light is light reflected by the reflective surface 23 of a tilting joystick base 22, a net electric current occurs which is either supplied to the timer 28 or drawn out from the timer 28. As a result, the pulse width of the PWM waveform is different as shown in FIGS. 5B, 5D).

Thus, a tilt of the joystick base 22 (that is, a tilt of the elongated member 14) in a single dimension (x-axis or y-axis) is detected. By combining multiple circuit arrangements for detecting the tilt of the joystick base 22 along different axes, it is possible to obtain a circuit for detecting tilts of the joystick base 22 in multi-dimensions.

Figure 6:
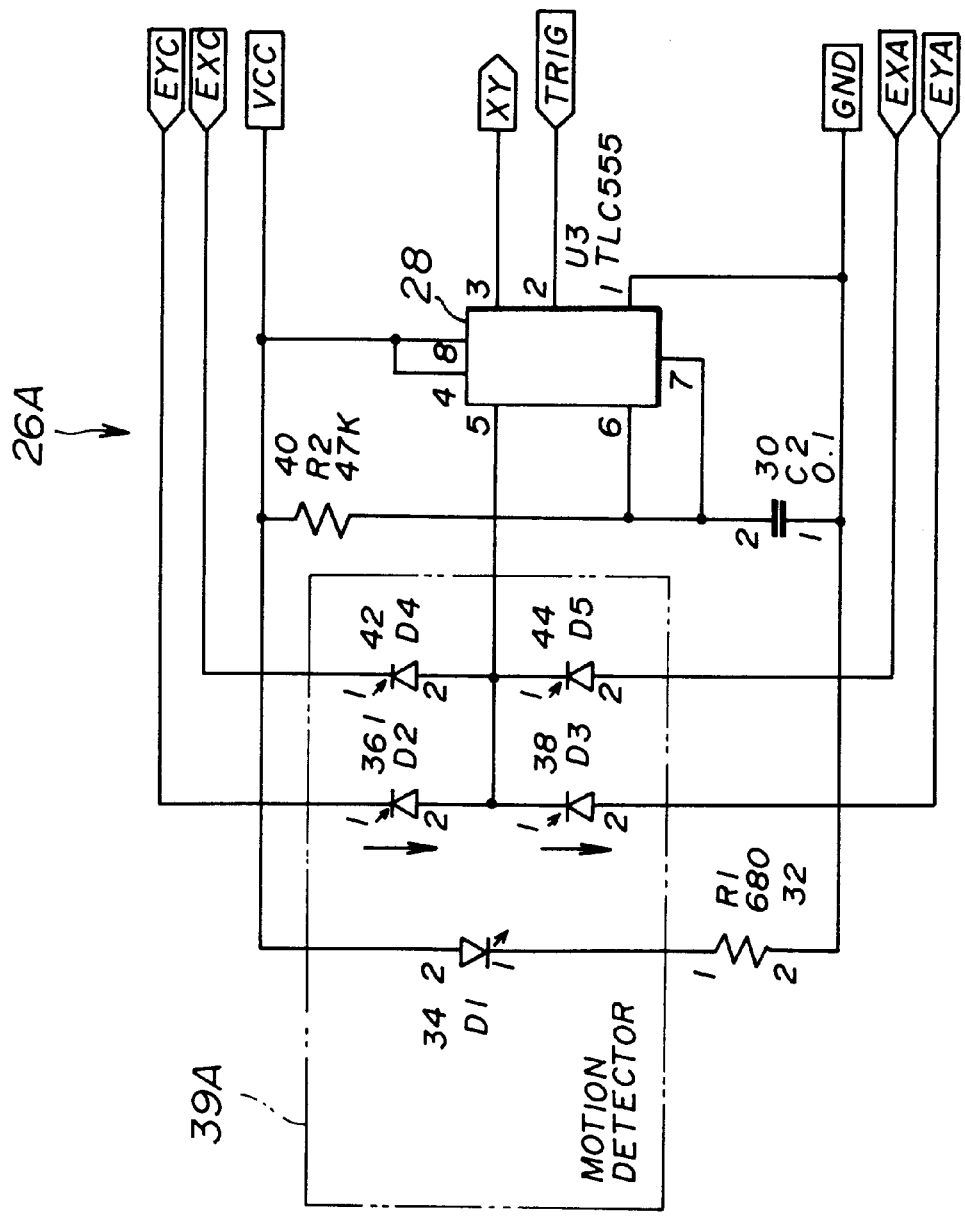
FIG. 6 shows a circuit diagram of one example of an RDIA circuit which can be applied to the peripheral input device in the embodiment of the present invention.

FIG. 6 shows an example of motion detection circuit 26A for detecting tilt of the joystick base 22 (that is, tilt of the elongated member 14) in two dimensions. In order to detect motion of the elongate member 14 of the joystick 10 in both the x-axis and y-axis, a dual motion detector 39A (an electric circuit contained in the joystick 10) is connected to the timer 28. This timer 28, then implements a Ratiometric Digital Instrumentation Amplifier (RDIA, not shown in the figure) which is proprietary of TV Interactive Corporation, San Jose, California, United States of America ("TVI"). A transmitter chip TVI 610, not shown in the figure, supplies multiplexing signals (EXC, EYC, EXA and EYA), and thereby, it is possible that the timer 28 sees only one motion detector at a time. This is accomplished by selectively enabling a matched pair of photodiodes at one time (e.g., two x-axis photodiodes). The transmitter chip is directly connected to the pulse-width modulator (an electric circuit including the timer 28 shown in FIG. 6) via an XY pin. The two pairs of photodiodes are multiplexed and thus either diode 36 and diode 38 or diode 42 and diode 44 (corresponding to the above-mentioned photodiodes 24b) are in the circuit at any one time. After selecting a motion detector and sending a trigger pulse (via the pin 2), the transmitter chip measures the resulting pulse width. The transmitter chip then uses the digital value representing the pulse width to generate a value corresponding to the angular position of the elongated joystick member 14.

When the third axis (that is, the z-axis) is added, it is added to the circuit by including a third pair of photodiodes, an LED therefor and corresponding multiplexing signals EZC and EZA.

The corresponding x, y and z position values are converted into a pulse-width-modulated waveform through the TVI 610, and the thus-obtained waveform is used for driving four arrow key inputs on the game console. FIGS. 7A, 7B, 7C, 7D and 7E show the waveforms for different tilting angles of the elongated member 14 of the joystick 10. When the elongated member 14 is in the neutral position, an output signal (output via the XY pin shown in FIG. 6) is at a high level (as shown in FIG. 7A). When the tilting angle is a slight angle, a single, short, active-low-level pulse is generated (as shown in FIG. 7B). When the tilting angle is a larger angle, a plurality of short pulses are generated as shown in FIG. 7C. As the tilting angle of the elongated member 14 increases, each pulse width increases, as shown in FIG. 7D. When the elongated member 14 tilts further from the neutral position, finally each pulse width reaches 100%, as shown in FIG. 7E.

In the joystick 10 having the above-described arrangement, except for the tilting elongated member 14, no moving parts are needed in connection with the x-axis and y-axis control. Further, in this optical motion detection method, by automatically determining that a current position of the elongated member 14 is the neutral position when the game console is powered up, it is not necessary to calibrate the elongated member 14 to be in the absolute neutral position. Furthermore, in this method, it is possible that the output signal of the motion detection circuit is either an analog signal or a digital signal.

With reference to FIGS. 8A, 8B, 9A, 9B, 10A, 10B, 11, 12, 13 and 14, another example of the motion detection circuit which can be applied to the embodiment of the present invention will now be described.

Figure 12:
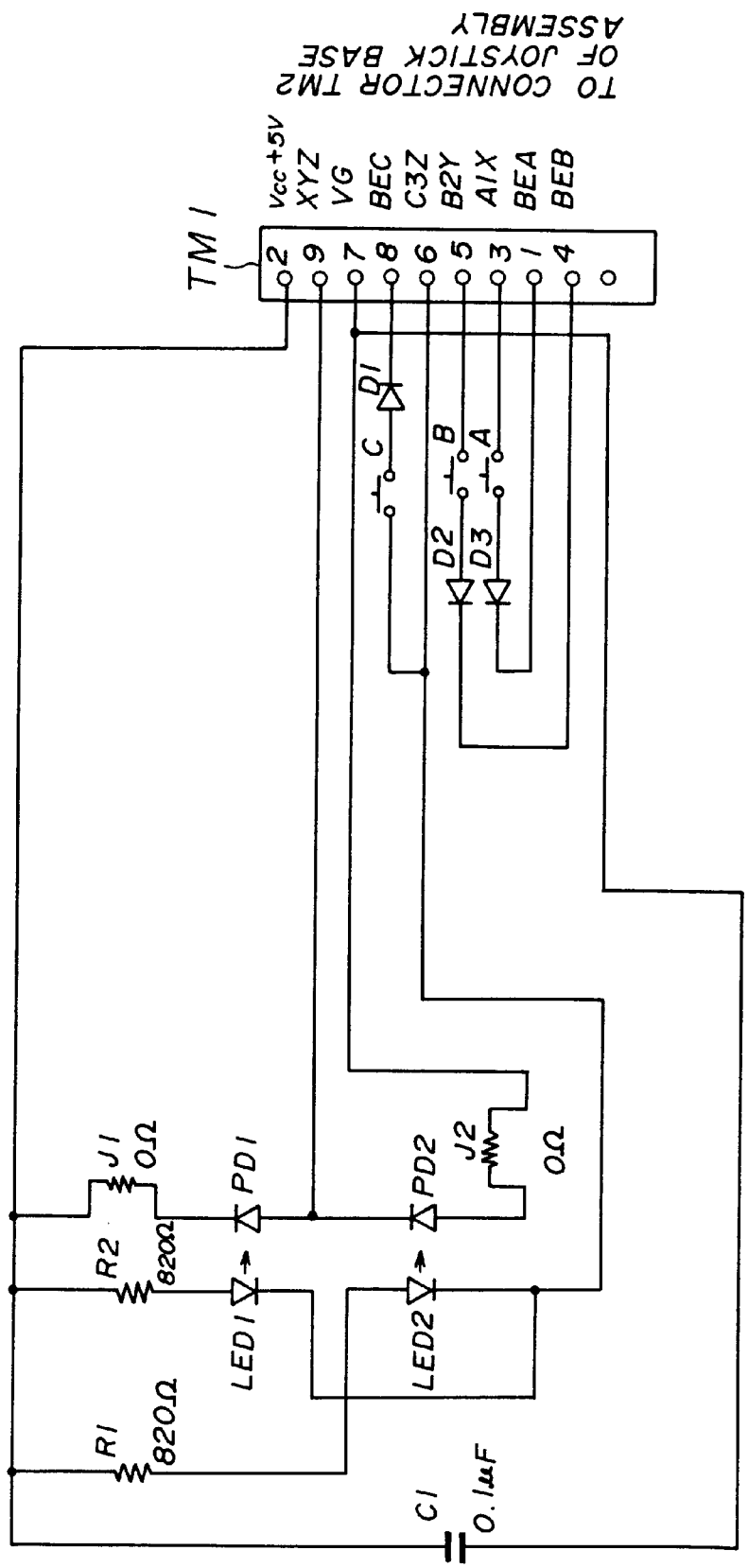
FIG. 12 shows a circuit diagram of an electric circuit contained in the elongated member of the joystick in the peripheral input device in the embodiment of the present invention.
Figure 13:
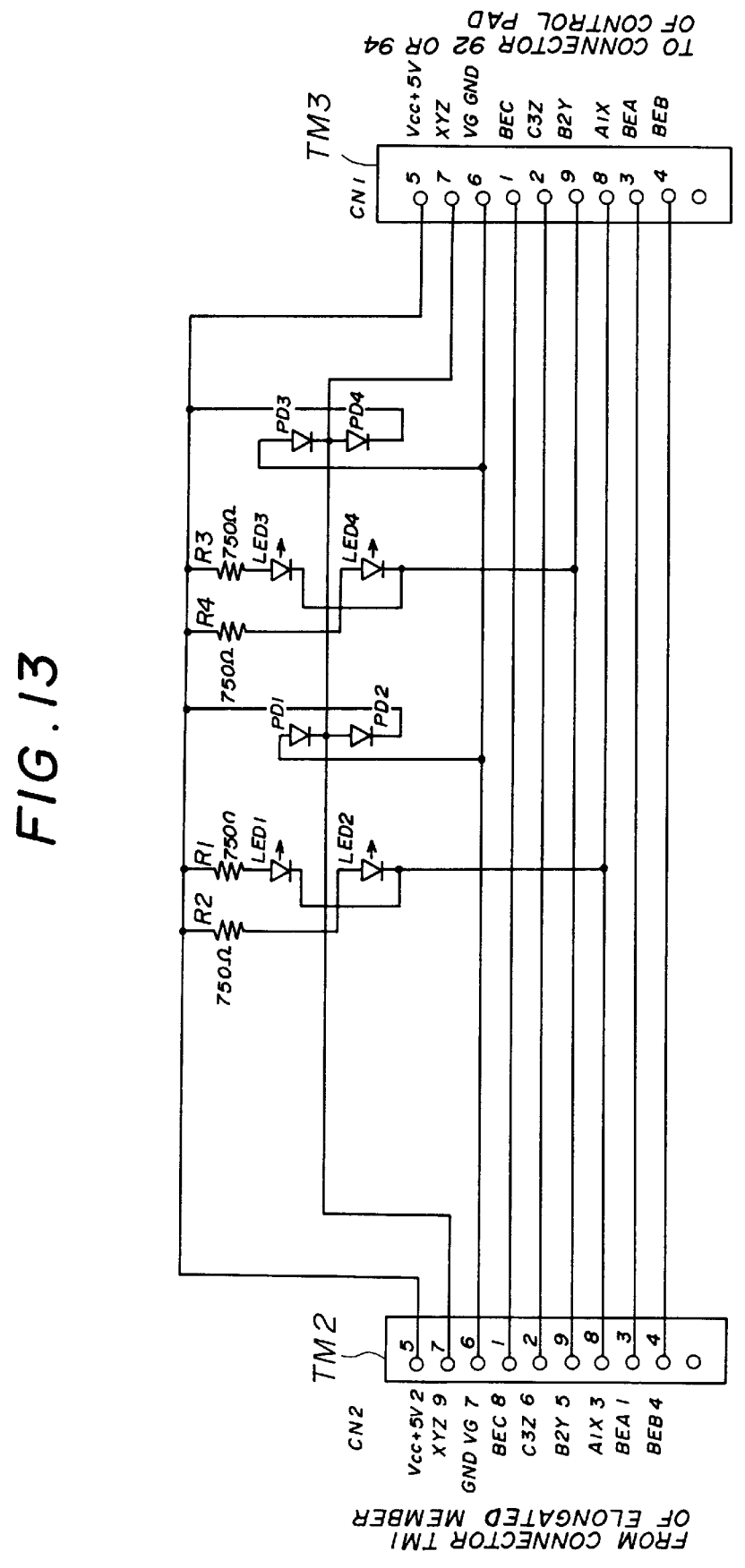
Figure 14:
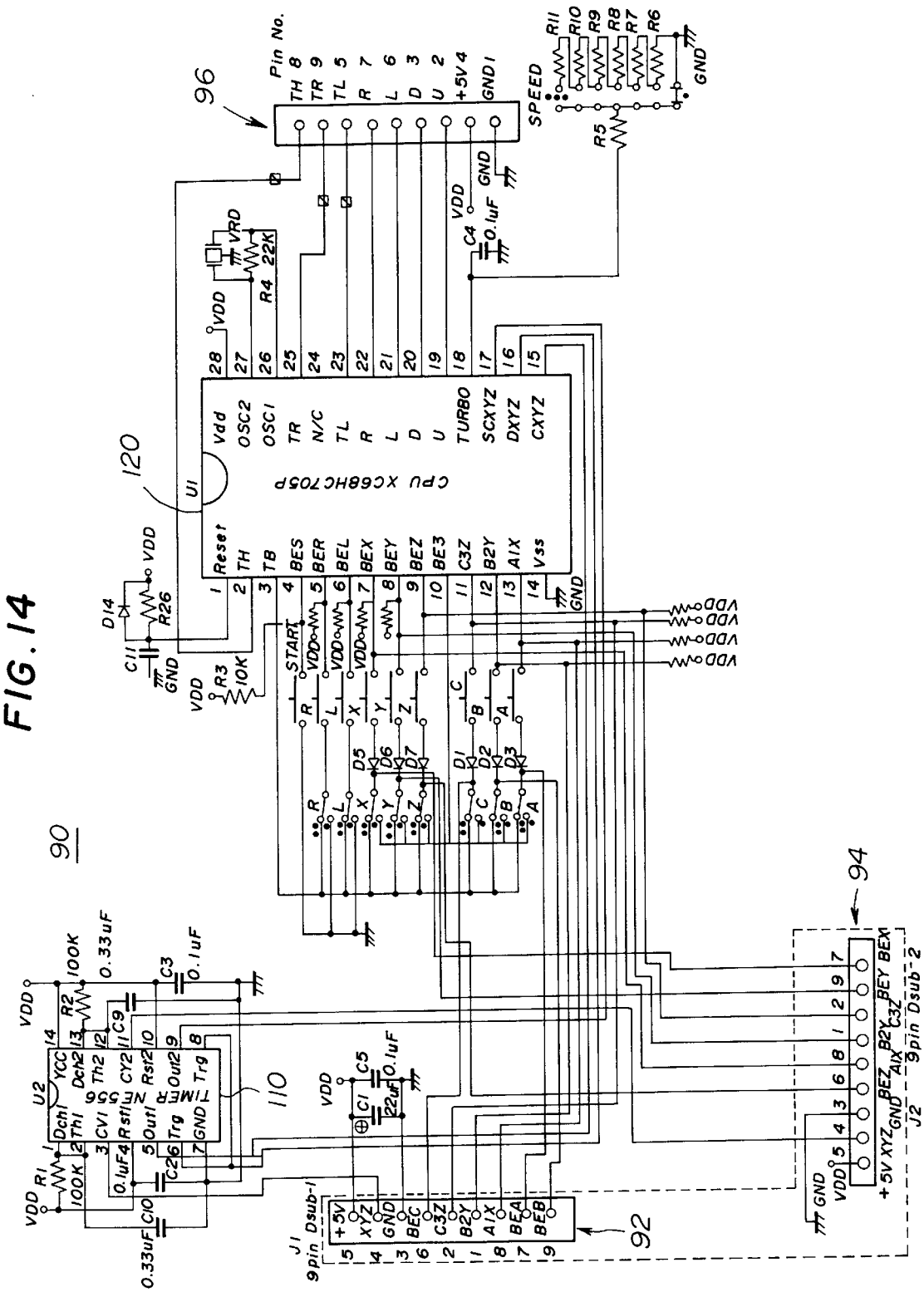
FIG. 14 shows a circuit diagram of an electric circuit contained in a control pad in the peripheral input device in the embodiment of the present invention.

FIG. 12 shows an electric circuit, contained in the elongated member 14, including LEDs 1, 2 and photodiodes PD1, PD2 for detecting motion of the thumb-operated rotor assembly 18. FIG. 13 shows an electric circuit, contained in the joystick base assembly 12, including LEDs 1, 2, 3, 4 (corresponding to the above-mentioned LEDs 24a) and photodiodes PD1, PD2, PD3, PD4 (corresponding to the above-mentioned photodiodes 24b) for detecting tilt of the elongated member 14. Further, FIG. 14 shows an electric circuit contained in a control pad 64 which will be described later. The electric circuit shown in FIG. 14 is electrically connected with the electric circuits shown in FIGS. 12 and 13 via connectors TM1, TM2 and TM3, processes signals from the above-mentioned photodiodes, generates signals having pulse widths indicating motions of the thumb-operated rotor assembly 18 and elongated member 14, and outputs the signals to the game console.

Figure 10A:
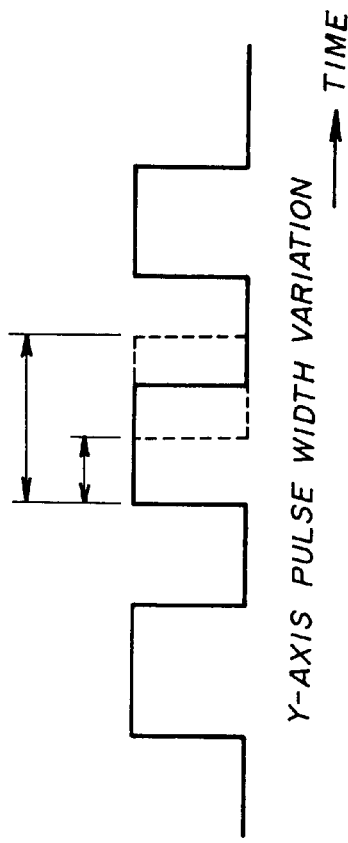
FIGS. 10A and 10B show a variation of the output pulses corresponding to forward and rearward (y-axis direction) tilt of the joystick shown in FIGS. 1A, 1B and 1C in the peripheral input device in the embodiment of the present invention.
Figure 10B:
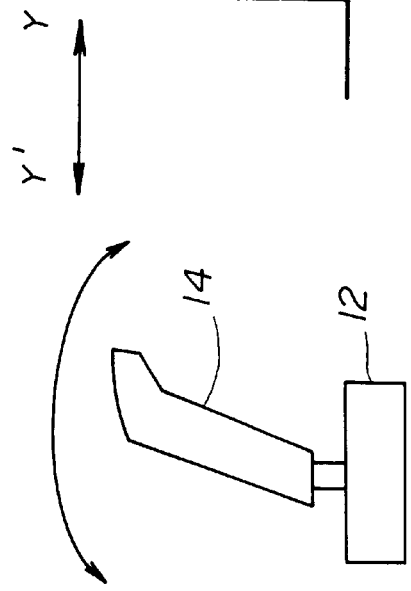

A connection point between each pair of the photodiodes pair PD1, PD2 (for the z-axis) shown in FIG. 12, the pair PD1, PD2 (for the x-axis) and the pair PD3, PD4 (for the y-axis) shown in FIG. 13 is commonly connected to an XYZ pin of each connector. By successively lighting the LEDs which illuminate these photodiodes, respectively, that is, the LED1, LED2 (for the z-axis) shown in FIG. 12 the LEDl, LED2 (for the x-axis) shown in FIG. 13 the LED1, LED2 (for the y-axis) shown in FIG. 13 in a time sharing manner, output pulses depending on user's operation applied to the joystick 10 for the respective axes can be obtained for respective predetermined timings, as shown in FIG. 8B. FIG. 8B shows the pulses for the respective axes when the elongated member 14 is in the neutral position. FIG. 9B shows the pulses for the respective axes when the elongated member 14 is tilted to the left and the right (x-axis directions). In FIG. 9B, as the elongated member 14 is actually tilting, the x-axis pulse is elongated or shortened along the time axis, as indicated by broken lines. FIG. 10B shows the pulses for the respective axes when the elongated member 14 is tilted forward and backward (y-axis directions). In FIG. 10B, as the elongated member 14 is actually tilting, the y-axis pulse is elongated or shortened along the time axis, as indicated by broken lines.

Figure 11:
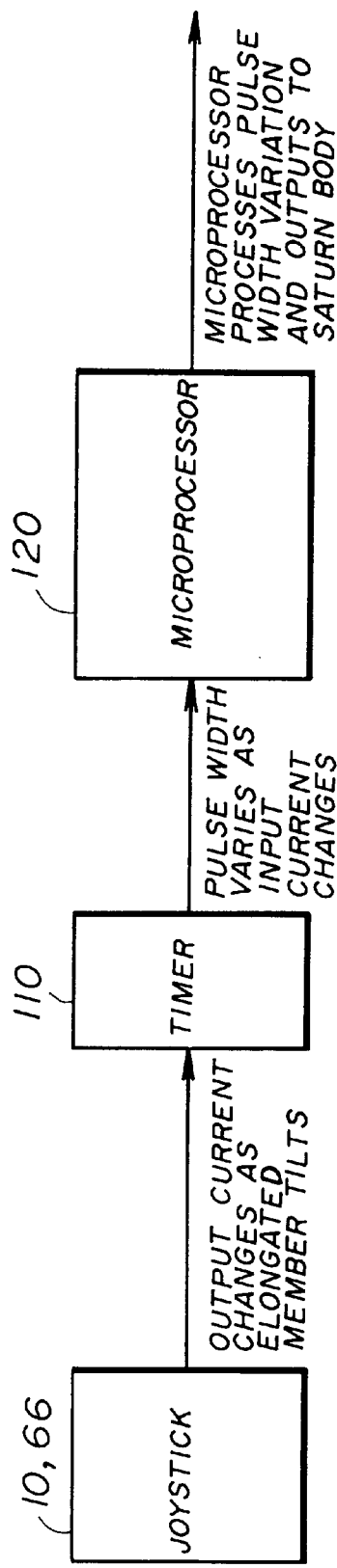
FIG. 11 shows a block diagram of an arrangement concerning processing of the output pulses shown in FIGS. 8B, 9B and 10B.

With reference to FIG. 11, an electric current supplied from or drawn into the connection point between each pair of photodiodes contained in the joystick 10 is input to the timer 110 in the control pad 64 via the XYZ pin. The timer 110 then causes the output pulse width to be elongated or shortened depending on the electric current as described above in accordance with a principle which may be substantially the same pulse-width modulation manner as that of the motion detection circuit shown in FIG. 4. The output pulse signal is supplied to the microprocessor 120 which then appropriately processes the output pulse signal and thus supplies the result to a game console not shown in the figure. The game console may then use this signal for moving a predetermined object in a game space in upward, downward, leftward, rightward, forward and backward directions, for example.

B. Z-Axis Rotor Assembly

Figure 15A:
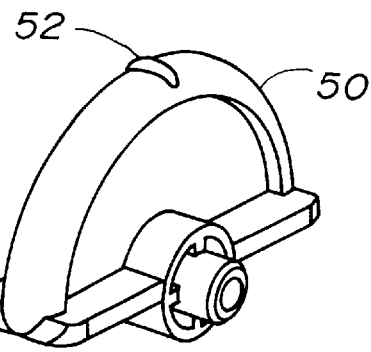
FIGS. 15A, 15B and 15C show perspective views viewed in three different directions of a rotor of a thumb-operated z-axis rotor assembly applied to the peripheral input device in the embodiment of the present invention.
Figure 15B:
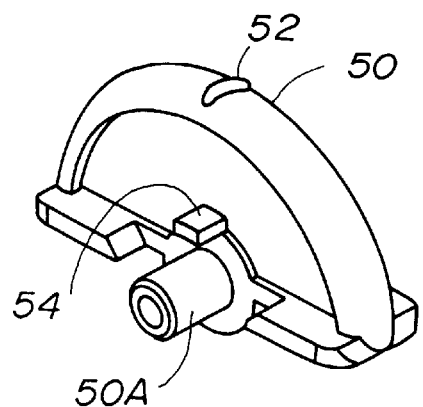
Figure 15C:
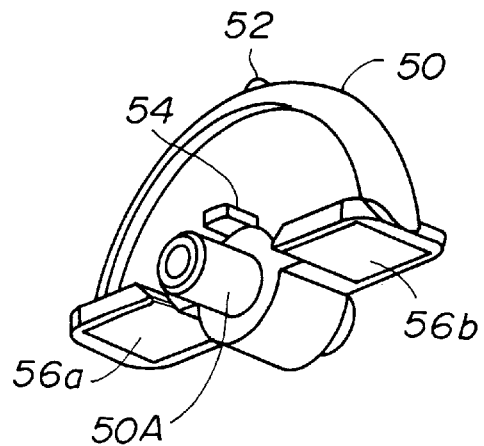

In the particularly preferable embodiment of the present invention, the joystick 10 has the rotor assembly 18 at the top of the elongated member 14 and the rotor assembly 18 enables the z-axis control. This position of the rotor assembly 18 is ergonomically appropriate for a human being who operates it when grasping the elongated member by a single hand, and the thumb of the hand is free in this position. It is convenient that this free thumb is used for operating the z-axis rotor assembly. FIGS. 15A, 15B and 15C show perspective views of a rotor 50 of the rotor assembly 18. The rotor assembly 18 is fitted at the top of the elongated member 14 in a manner in which only an edge of the rotor 50 is exposed and accessible to the user. Such characteristics of joystick design are disclosed in the above-mentioned design patent applications listed above in the Related Application section and are incorporated herein by reference.

Figure 19A:
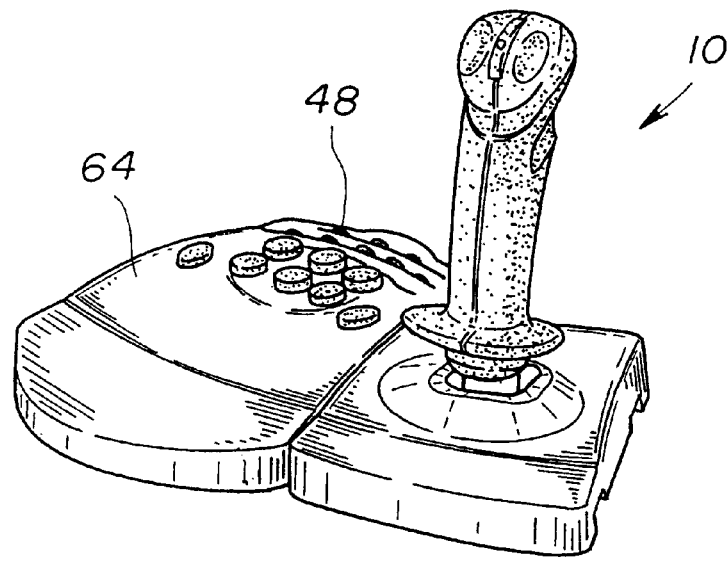
FIGS. 19A and 19B show perspective views of the peripheral input device in the embodiment of the present invention in a state in which only the single joystick is attached to the control pad and a state in which two joysticks are attached to the control pad, respectively.
Figure 19B:
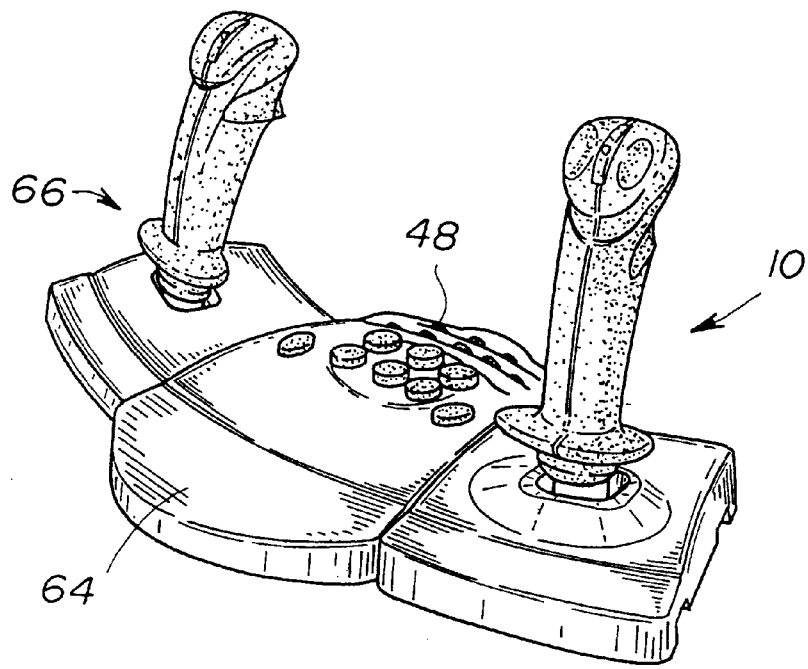

In this embodiment, a marking 52 indicating a center position (or middle point) of the rotor 50 is formed on the rotor 50. Although the marking 52 is formed as a result of a part of the rotor 50 projecting, a form of the marking 52 is not limited thereto. It is also possible that such a marking may be indented or scored to designate the center position. The rotor 50 has at an axis position a cylindrical portion 50A axially projecting and also a tab 54 also projecting in the same axial direction above and adjacent to the cylindrical portion 50A. This tab 54 is used cooperatively with scissors members 58A, 58B shown in FIGS. 16A, 16B for rotating and thus returning the rotor 50 to a neutral position when a force applied to the rotor 50 is relieved. This rotor 50 also has reflective surfaces 56a and 56b at the bottom thereof. These reflective surfaces 56a and 56b are used together with the infrared LEDs 24a and photodiodes 24b located below and aligned so as to face the reflective surfaces 56a, 56b as shown in FIGS. 19A, 19B. Thus, by using the Ratiometric technique as described above with regard to the x-axis and y-axis, the reflective surfaces 56a, 56b, LEDs 24a and photodiodes 24b are used for generating z-axis position data. A principle for detecting a tilt or rotation of the rotor 50 using the reflective surfaces 56a, 56b, LEDs 24a and photodiodes 24b is the same as the principle according to which the tilt of the joystick base 22 is detected as described above, and also an arrangement thereof is also similar to that for detecting the tilt of the joystick base 22. Further, see also the description above about the circuitry and multiplexing necessary to achieve three-axis measurements.

In the preferable embodiment, the reflective surfaces 56a, 56b are located to face the LEDs 24a and photodiodes 24b, and all of the reflective surfaces 56a, 56b, LEDs 24a and photodiodes 24b are contained in the elongated member 14. When the rotor 50 is rotated with respect to its neutral position by the thumb of the user, distances between the reflective surfaces 56a, 56b and the LEDs 24a and photodiodes 24b vary. Thus, a signal indicating the z-axis position is generated. In this system using the Ratiometric method, without providing the kinds of moving parts and calibration steps previously associated with joystick design, the analog or digital z-axis position data is obtained through the thumb-operated rotor assembly 18.

Figure 16A:
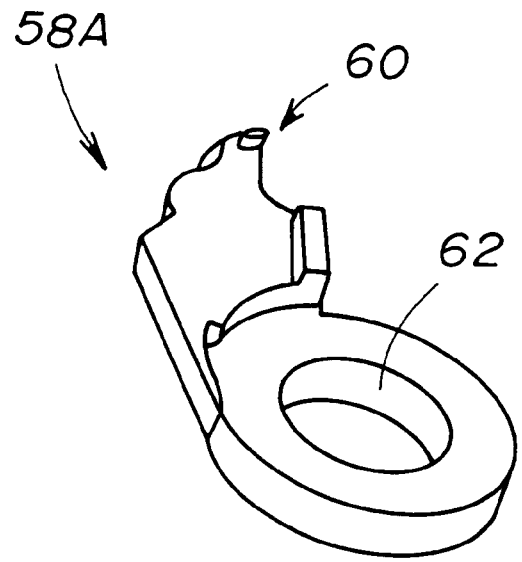
FIGS. 16A and 16B show perspective views of two scissors members (z-axis spring holders) of the thumb-operated z-axis rotor assembly applied to the peripheral-input device in the embodiment of the present invention.
Figure 16B:
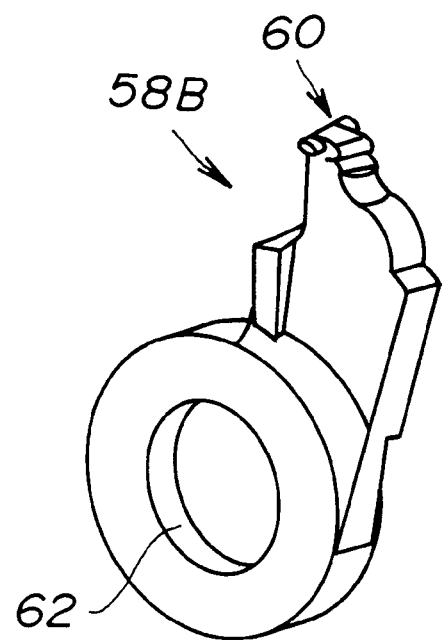

FIGS. 17A, 17B show a spring-loaded returning mechanism. A prong 60 is formed at the top of each of the scissors members 58A and 58B as shown in FIGS. 16A, 16B. A respective end of a spring SP is hung on the prong of each scissors member 58A, 58B. A elastic restoration force of the spring SP for shortening it is a force opposite to a force of the user's thumb to rotate the rotor 50 from its neutral position. As shown in FIGS. 16A, 16B, each scissors member 58A, 58B a circular opening 62 formed therein. The cylindrical portion 50A of the rotor 50 shown in FIGS. 15A, 15B, 15C is inserted in the circular opening 62 of each scissors member 58A, 58B. Thus, the rotor 50 and two scissors members 58A, 58B are rotatably supported by each other. Thus, the spring-loaded returning mechanism shown in FIGS. 17A, 17B is provided. As shown in FIG. 17B, the tab 54 of the rotor 50 is pressed by a portion lower than the prong 60 of one of the scissors members 58A and 58B due to the elastic restoration force of the spring SP hung at its two ends on the prongs 60 of the two scissors members 58A and 58B, and thus the rotor 50 which has been once rotated tends to return to its neutral position.

FIGS. 18A and 18B show an internal side elevational view of one-side housing 14E of the elongated member 14 and an E—E line cross-sectional view thereof, respectively. The rotor 50, scissors members 58A, 58B rotatably supported by each other are then rotatably supported on the housing 14E of the elongate member 14 as a result of the cylindrical portion 50A of the rotor 50 which has passed through the openings 62 of the scissors members 58A, 58B being then inserted into a cylindrical hole 14R of the housing 14E. However, as shown in FIG. 17A, in a condition in which the rotor 50 and scissors members 58A, 58B are thus fitted on the housing 14E, a tab 14P integrally formed to internally project from the housing 14E, as well as the tab 54 of the rotor 50, are inwardly pressed by and between portions lower than the prongs 60 of the two scissors members 58A, 58B. Thereby, as shown in FIG. 17B, the rotor 50 which been rotated by the thumb of the user from the neutral position is caused to return to the neutral position as a result of the two scissors members 58A, 58B inwardly pressing the tab 14P of the housing 14E and the tab 54 of the rotor 50 therebetween.

The present invention using the z-axis rotor assembly is not intended to be limited to x-axis and y-axis controllers such as those described above utilizing the Ratiometric methods described above. It is understood that the rotor mechanism for z-axis control may be used in conjunction with traditional x-axis and y-axis controllers which utilize gimbals or slides to establish x-axis and y-axis position data.

C. Control Pad with Microprocessor and Dual Joysticks

Figure 20B:
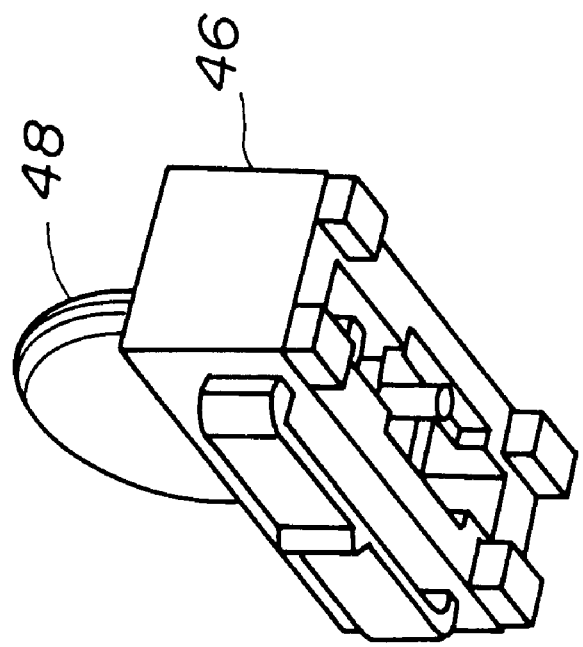
FIGS. 20A and 20B show two-directional perspective views of a slide switch provided in the control pad shown in FIGS. 19A and 19B.
Figure 20A:
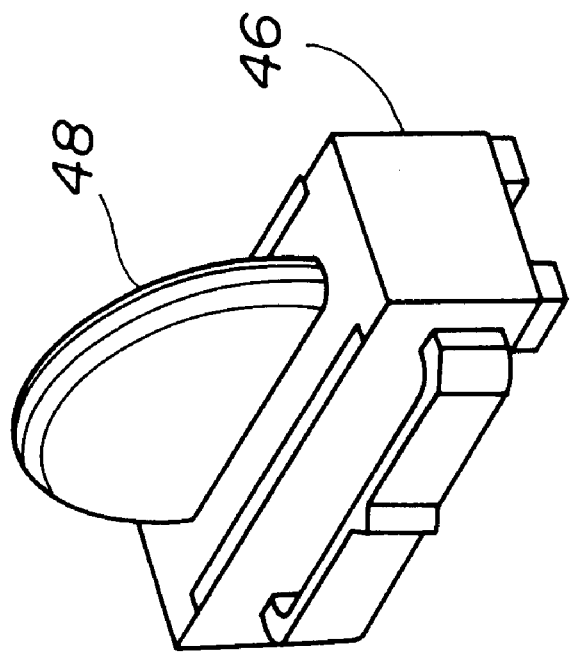

The above-mentioned Sega Saturn™ videogame Game Console with the Mission Stick Accessories (input devices) are produced so as to enable three-axis play and six-axis play. FIGS. 19A, 19B show perspective views of a three-axis peripheral input device and six-axis peripheral input device for the Sega Saturn™ Videogame Game Console (which may be simply referred to as the Saturn™ game console, hereinafter). In the arrangement shown in FIG. 19B, the central control pad 64 is flanked by the first joystick 10 and a second joystick 66 similar to the first joystick 10. This control pad/joystick design is the subject of the above-mentioned related design patent application entitled CONTROL PAD WITH DUAL CONTROL STICK and its contents are herein incorporated by reference. As shown in the figures, many switches are provided on the top surface of the control pad 64. These switches are used together with the two joysticks 10 and 66 for controlling computer game play. FIGS. 20A and 20B show a slide switch assembly 46 thereof. A disk 48 which is a moving part of the slide switch assembly 46 is exposed from the top surface of the control pad 64 and thus can be slid and thus operated by a finger of the user. Two input ports are provided on the rear surface of the control pad 64, and thereby, the two joysticks 10 and 66 arranged adjacent to the control pad 64 are electrically connected to the control pad 64. When the two joysticks 10, 66 are thus attached to the control pad 64, the control pad 64 can be used for outputting position data which enables the six-axis game play performed through the game console.

FIG. 21 shows a block diagram indicating relationship between the control pad, the game console and the joysticks.

FIG. 21 shows the Saturn™ game console 86 set up for play by two players, each player having an independent peripheral input device 68 or 70. A first peripheral input device 68 includes the control pad 72 having the microprocessor and the two three-axis input devices 74 and 76. The peripheral input device 68 is electrically connected with the Saturn™ game console 86 via a cable 78. A second peripheral input device 70 includes the control pad 80 having the microprocessor and the two three-axis input devices 82, 84. The peripheral input device 70 is electrically connected with the Saturn™ game console 86 via a cable 88.

According to the present invention, the microprocessor of each control pad is set up to determine whether one three-axis joystick is attached the control pad or two three-axis joysticks are attached to the control pad. (Such determination may be performed by, for example, measuring an electric current externally supplied between the XYZ pin and GND pin of each of the connectors 92 and 94 shown in FIG. 14.) If only one three-axis joystick is connected to the control pad when the control is powered up, the microprocessor of the control pad generates an address signal or an ID code indicating to the game console that the peripheral input device is arranged for the three-axis game play. If two three-axis joysticks are attached to the control pad, the microprocessor of the control pad generates an address signal or an ID code indicating to the game console that the peripheral input device is arranged for the six-axis game play. Thus, each control pad having the microprocessor enables the player to use two three-axis joysticks via the single input port of the game console 86. The microprocessor also enables the three-axis game play using the single three-axis joystick if only one three-axis joystick is connected to the control pad at the time. By these features, without connecting any additional input cable to the game console itself, the peripheral input device is converted from the three-axis system to the six-axis system, and then to the three-axis system again. Further, by not using the second player port of the game console, it is possible to limit the use of the game console to that for a single player.

FIG. 14 shows the electric circuit of each control pad. The first three-axis joystick is electrically connected to the first input port of the control pad via a connector 92. The second three-axis joystick is electrically connected to the second input port of the control pad via a connector 94. The circuit of the control pad is electrically connected to the game console via a connector 96.

When the control pad is powered up, the microprocessor 120 of the control pad looks at the second input port for the second three-axis joystick, and thus determines whether or not a device is attached to that input port. If a device is attached to that port, then it is determined what is the ID code for the peripheral input device. (Such determination may be performed by, for example, measuring an electric current externally supplied between the XYZ pin and GND pin of the connector 94 shown in FIG. 14.) If it is thus determined that a three-axis joystick is connected to the second input port, that control pad generates a predetermined ID code indicating that two three-axis joysticks are attached to the control pad. (For the user, it is previously noted as handling instructions for the game console and control pads that, when a single joystick is attached to the control pad, it should be attached to the first input port.) This ID code is accessed by the microprocessor of the game console when it is started up, and thus various peripheral input devices can be identified. Such an ID code (for a peripheral input device) sent from the control pad is accessed by the microprocessor of the game console and stored in registers of the microprocessor. Each time when a game play is started through a game software in the game console, the game software includes codes which instructs the game console to access the ID codes (for peripheral input devices) stored in the registers. If the stored ID code is acceptable to the game, then the game play begins, and the control pad and the game console communicate in the data format directed by the microprocessor of the game console. If the ID code (for the peripheral input device) is not acceptable to the game, then the game software will provide a message to the player that the peripheral device must be rearranged to begin the game play.

This aspect of the present invention has been described with reference to three-axis joystick devices. It will be understood by those of ordinary skill in the art that the joystick devices may be replaced with track balls, mouse controllers, other multi-axis input devices, and various combinations thereof.

The present invention is not limited to the above-described embodiments, and variations and modifications may be made without departing from the scope of the present invention.

What is claimed is:

1. A peripheral input device, comprising:
   a plurality of input units; and
   a microprocessor, a plurality of input ports, and an output port, wherein;
   each of said plurality of input units is connected with a respective one of said plurality of input ports;
   said output port is connected with a game console; and
   said microprocessor outputs a signal to said game console, said signal indicating a number of input units, of said plurality of input units, which are connected with respective ones of said plurality of input ports.

2. The peripheral input device as claimed in claim 1, comprising a control pad which comprises said microprocessor, said plurality of input ports and said output port,
   wherein said plurality of input units comprise two input units; and
   said control pad is provided between said two input units, said two input units and said control pad are arranged integrally.

3. The peripheral input device as claimed in claim 1 wherein said signal output by said microprocessor to said game console through said output port indicates at least two input units.

4. The peripheral input device as claimed in claim 1 wherein said signal output by said microprocessor is output through only said output port.

5. The peripheral input device as claimed in claim 1 wherein each input unit includes a pair of photodiodes and each input unit outputs a signal indicative of a ratio value between currents through the respective photodiodes.

6. The peripheral input device as claimed in claim 1 wherein each input unit can provide three axis signals to said microprocessor, said microprocessor provides multiplexed output signals to said output port.

7. The peripheral input device as claimed in claim 1 wherein each input unit provides a pulse width modulated output signal.

8. A peripheral input. device, comprising:
   a base having an approximately plane shape;
   a joystick member provided on said base, wherein the longitudinal axis of said joystick member is approximately perpendicular to said plane of said base and said joystick member is tiltable; and
   an elastic member provided between said base and said joystick member, said elastic member applying force to said joystick member such that said longitudinal axis of said joystick member is returned to be approximately perpendicular to said plane of said base after said joystick member is tilted by a user,
   wherein:
   said base has a two-axis-input detecting unit which detects a tilted condition of said joystick member so as to obtain a two-axis-direction input; and
   said joystick member has a first end in proximity of said base and a second end opposite to said first end, and has an other-axis-input detecting unit at said second end, said other-axis-input detecting unit obtaining an other-axis-direction input, said other axis being an axis other than said two axes.

9. The peripheral input device as claimed in claim 8, wherein:
   said joystick member has a joystick-base surface at said first end thereof, said joystick-base surface has a reflective surface facing the plane of said base;
   said two-axis input detecting unit has a light emitting unit and a light detecting unit, detects the tilted condition of said joystick member as a result of said light emitting unit emitting light to said reflective surface and the light reflected by said reflective surface being detected by said light detecting unit, and obtains x-y-axis-direction input; and
   said other-axis input detecting unit obtains z-axis-direction input.

10. The peripheral input device as claimed in claim 8, wherein said other-axis-input detecting unit is disposed at a position of a thumb when a user grasps said joystick member.

11. The peripheral input device as claimed In claim 10, wherein:
   said other-axis input detecting unit comprises a rotor having a semicircular-disk shape, said rotor being selectively rotatable about a center of said semicircular disk, an elastic tension member for returning the rotated rotor to a predetermined position, and a rotor-rotation-amount detecting unit for obtaining the other-axis-direction input as a result of detecting rotation amount of said rotor; and
   an arc portion of said rotor is exposed from said joystick member.

12. The peripheral input device as claimed in claim 11, wherein:
   said rotor has a reflective surface which is perpendicular to the plane of said semicircular disk and faces away from said semicircular disk;
   said rotor-rotation-amount detecting unit has a light emitting unit and a light detecting unit or a surface facing said reflective surface, and detects the rotation amount of said rotor as a result of said light emitting unit emitting light to said reflective surface and the light reflected by said reflective surface being detected by said light detecting unit.

13. The peripheral input device as claimed in claim 12, wherein said rotor is provided with a marking at the center of the semicircular arc of said semicircular disk.

14. An input device, comprising:
   a plurality of peripheral input devices; and
   a microprocessor, a plurality of input ports and an output port,
   wherein:
   each of said plurality of peripheral input devices is connected with a respective one of said plurality of input ports;

said output port is connected with a game console; and said microprocessor outputs a signal to said game console, said signal indicating a number of peripheral input devices, of said plurality of peripheral input devices, which are connected with respective ones of said plurality of input ports, wherein each of said plurality of peripheral input devices comprises:

a base having an approximately plane shape;

a joystick member provided on said base, wherein the longitudinal axis of said joystick member is approximately perpendicular to said plane of said base, and said joystick member is tiltable; and an elastic member provided between said base and said joystick member, said elastic member applying force to said joystick member such that said longitudinal axis of said joystick member is returned to be approximately perpendicular to said plane of said base after said joystick member is tilted by a user, wherein;

said base has a two-axis-input detecting unit which detects a tilted condition of said joystick member so as to obtain two-axis-direction input; and said joystick member has a first end in proximity of said base and a second end opposite to said first end, and has an other-axis-input detecting unit at said second end, said other-axis-input detecting unit obtaining an other-axis-direction input, said other axis being an axis other than said two axes.

* * * * *